United States Patent
Gurreri

(10) Patent No.: US 8,308,374 B2
(45) Date of Patent: Nov. 13, 2012

(54) MATING OF OPTICAL FIBERS HAVING ANGLED END FACES

(75) Inventor: Michael L. Gurreri, York, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 13/360,924

(22) Filed: Jan. 30, 2012

(65) Prior Publication Data

US 2012/0128304 A1 May 24, 2012

Related U.S. Application Data

(63) Continuation of application No. 12/847,654, filed on Jul. 30, 2010, now Pat. No. 8,104,974.

(51) Int. Cl.
*G02B 6/25* (2006.01)
*G02B 6/38* (2006.01)

(52) U.S. Cl. .......................... 385/72; 385/140

(58) Field of Classification Search .................... 385/72, 385/140

See application file for complete search history.

(56) References Cited

U.S. PATENT DOCUMENTS

| 5,319,733 | A * | 6/1994 | Emmons et al. ............. 385/140 |
| 2003/0091294 | A1 * | 5/2003 | Sasaki et al. ................. 385/71 |
| 2011/0110630 | A1 | 5/2011 | Hashimoto |

FOREIGN PATENT DOCUMENTS

| JP | 63-179304 A | 7/1988 |
| WO | 2009/153930 A1 | 12/2009 |

OTHER PUBLICATIONS

International Search Report, dated Oct. 17, 2011, issued in PCT Application No. PCT/US2011/001307.

* cited by examiner

*Primary Examiner* — Jerry Rahll

(57) ABSTRACT

A method for mating optical fibers, a fiber optic connector, and a fiber optic subassembly are provided in which mating fibers have angled end faces joined by index matching fluid, but in which the angled end faces of the fibers are positioned relative to one another in rotationally misaligned relationship. Applicants discovered unexpectedly that optical fibers can be spliced, to provide satisfactory optical connections, without the need for matched cleaves, and without the need for precise rotational alignment of the cleaves, provided that angled end faces are provided on both the launch and receive fibers and that index matching gel is provided between the angled end faces. Thus, the fibers are mated in positions other than in the precise rotationally aligned position previously believed essential to adequate optical performance. Angled end faces may be positioned less than 165 degrees out of phase.

20 Claims, 5 Drawing Sheets

MATING OF OPTICAL FIBERS HAVING ANGLED END FACES

CROSS-REFERENCE TO RELATED APPLICATIONS

This application is a continuation of U.S. application Ser. No. 12/847,654, filed Jul. 30, 2010, the entire disclosure of which is hereby fully incorporated herein by reference.

FIELD OF INVENTION

The present invention relates generally to mating of optical fibers, and more particularly, to mating fibers prepared to have angled end faces.

BACKGROUND

Fiber optic communication systems include optical connectors that mate segments of optical fibers. The principal function of an optical fiber connector is to hold a fiber end such that the core of the fiber is axially aligned with the optical path of the fiber component, etc. to which the connector is mated, e.g., so that light from the one fiber is optically coupled to another. This is achieved by holding the end of the fiber such that the core of the fiber is axially aligned with the optical pathway of the mating fiber. By way of example, optical fibers may be mated at a splice, e.g., within a single connector, or may be mated between one or more connectors or optoelectronic devices.

To facilitate an effective optical coupling between a connector and another connector or other device, the end face of the connector's ferrule is typically polished. Preparing a polished ferrule is a sophisticated process. It requires cleaving the fibers, terminating them in a ferrule, and polishing the ferrule to exacting tolerances. Therefore, such a process is usually performed in a controlled setting with precision equipment by skilled personnel. Frequently, however, connectors must be terminated in the field where such facilities and personnel are not available. Under these conditions, it is desirable to omit the step of polishing the ferrule by instead splicing the field fiber to a fiber stub already terminated within a polished ferrule of a connector. Because the ferrule is already polished in a fiber-stub, field-installable connector, field installation requires only optically coupling the field fiber to the fiber stub by forming a splice therebetween.

Conventional technology involves perpendicular cleaving of the fiber ends to create a fiber end face that is substantially planar, and substantially normal to an axis of the fiber. The ends of the fibers are typically mated by introducing a refractive index-matched gel to improve optical coupling therebetween. The optical reflectance of such a joint is typically 40-60 dB under ambient temperature conditions, which is suitable for many optical communication applications. However, as the connector temperature departs from the ambient, the refractive index of the gel changes, which increases the reflectance at the splice. This increase can cause degradation of the optical signal, particularly when coherent light sources are used for signal propagation.

It has been found that improved optical connections can be made, with and without index matching gel, by mating fibers that have been prepared to have an angled end face, e.g., one that is substantially flat but that is not substantially perpendicular to the optical axis of the fiber. Various techniques and tools for providing an angled end face are well known in the art. Providing an angled end face tends to cause light reflected at the fiber interface to be reflected at an angle into the cladding of the fiber, rather than back down the fiber core where it can interfere and diminish forward-propagating optical signals. Such mating arrangements can therefore improve (increase) return loss, which is the ratio of input power to reflected power.

Though the advantages of angle cleaved fibers is well-known, conventional wisdom holds that in order to mate an angle cleaved fiber, the mating fiber must be similarly angle cleaved. Further, conventional wisdom holds that the angle-cleaved launch fiber must be rotationally aligned to mate with the angle-cleaved receive fiber (i.e., they must be rotationally positioned 180 degrees out of phase with respect to rotation about a common optical axis, as shown in FIG. 1.) to optically couple properly.

As noted in U.S. Pat. No. 7,567,743, the entire disclosure of which is hereby incorporated herein by reference, if there is even slight rotational misalignment (e.g., up to 15 degrees of angular rotation about a common optical axis from the 180 degrees out-of-phase position), the angled end faces of the launch and receive fibers will physically interfere and create a longitudinal gap between two fibers. Thus, conventional wisdom holds that to properly terminate an angle cleaved fiber in the field, it must be cleaved in the same manner (e.g., at the same angle) as the mating fiber and be precisely rotationally aligned with the mating fiber.

Keeping the fibers/ferrules properly oriented rotationally is complicated by the fact that the angle of the cleave cannot be perceived by the naked eye. Accordingly, to avoid rotational misalignment, complex and relatively expensive tools and techniques were developed. By way of example, U.S. Pat. No. 7,567,743 and U.S. Pat. App. Pub. No. 2009/0180742, the entire disclosures of which are hereby incorporated herein by reference, disclose devices for precisely rotationally aligning, and mating in complementary fashion, fibers having matching angled cleaves.

Therefore, an approach is needed for simplifying mating of angle cleaved fibers that eliminates the need for such complex tools and techniques, and that ensures a connection or splice providing return loss/reflectance within an acceptable range. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Generally, the present invention provides for a method for mating optical fibers, a fiber optic connector, and a fiber optic subassembly in which mating fibers have angled end faces joined by index matching fluid, but in which the angle end faces of the fibers are positioned relative to one another in rotationally misaligned relationship. In other words, the fibers are mated in positions other than in the precise rotationally aligned position (180 degrees out of phase in rotation about a common optical axis, +/−15 degrees). Accordingly, the need to precisely align mating fibers, as widely recognized in the prior art, is avoided, and yet a satisfactory optical connection may be obtained. Further, the present invention permits random relative rotational orientation of mating fibers, thus eliminating the need to precisely align fibers for mating purposes.

By way of background, Applicants discovered unexpectedly that optical fibers can be spliced to provide satisfactory optical connections for most applications, without the need for matched cleaves, and without the need for precise rotational alignment of the cleaves, provided that angled end faces are provided on both the launch and receive fibers and that index matching gel is provided between the angled end faces.

More specifically, one aspect of the present invention provides a method for mating optical fibers that involves angle cleaving a first optical fiber to provide a launch fiber having an angled end face, and a second optical fiber to provide a receive fiber having a respective angled end face. The method further involves applying index matching fluid adjacent one of the angled end faces, positioning the angled end faces in close and rotationally misaligned relationship with the index matching fluid therebetween, and securing at least one of the first and second optical fibers to maintain rotational misalignment between the angled end faces. Thus, the fibers are mated without taking care to ensure that the mating fibers are in precise rotational alignment. Optionally, the angled end faces are rotationally positioned about a common optical axis less than 165 degrees out of phase, or less than 150 degrees out of phase.

Another aspect of the present invention provides a fiber optic connector including a housing, a ferrule having a distal end, the ferrule being supported on the housing, and a fiber stub secured in the ferrule, the fiber stub having a first end adjacent the ferrule's distal end and a second end positioned proximally of the distal end, the second end having an angled end face. The connector further includes a mating optical fiber, secured to the housing, that has a respective angled end face positioned in close and rotationally misaligned relationship with the angled end face of the fiber stub to form a splice. The connector further includes index matching fluid positioned between the angled end faces of the fiber stub and the mating optical fiber. The angled end faces may be matched or mismatched. Further, the angled end faces may be rotationally positioned less than 165 degrees, or less than 150 degrees, out of phase about a common optical axis.

Another aspect of the present invention provides a fiber optic subassembly that includes a housing joining first and second optical fibers having angled end faces that are positioned in close and rotationally misaligned relationship, with index matching fluid positioned therebetween to form an optical connection. The angled end faces may be matched or mismatched. Optionally, the angled end faces may be rotationally positioned less than 165 degrees out of phase, or less than 150 degrees out of phase, about a common optical axis.

BRIEF SUMMARY OF DRAWINGS

The present invention will now be described by way of example with reference to the following drawings in which.

DETAILED DESCRIPTION

Referring again to FIG. 1, exemplary optical fibers are shown in diagrammatic side view. This arrangement is typical of the prior art in that both the launch and receive fibers 10, 50, have similarly-formed, referred to herein as "matched" or "matching," angle-cleaved end faces 12, 52. In the example shown, these end faces 12, 52 are substantially flat, as is typical, for example, of a mechanically cleaved fiber, as well known in the art. Further, these end faces are "angle-cleaved," or "angled." As used herein, the terms "angle-cleaved" and "angled" refer to an end face that has a substantially-planar portion that is formed at an acute angle θ relative to a plane normal to the optical axis of the fiber, as shown in FIG. 1.

Figure 1:
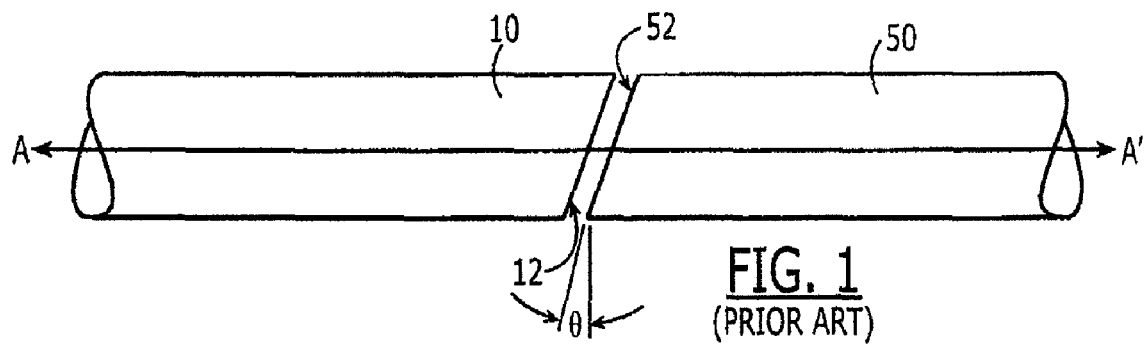
FIG. 1 is a diagrammatic side view of optical fibers having exemplary matching angle-cleaved end faces, and shown in rotational alignment (180 degrees out of phase along a common optical axis) for mating in accordance with prior art mating techniques.

Further, the exemplary fibers 10, 50 of FIG. 1 are shown arranged in a typical prior art arrangement for satisfactory optical coupling in that they are positioned in conventional rotational alignment. As user herein "rotational alignment" and "rotationally aligned" refer to relative positions of the fibers 10, 50 such that one of the fibers (and its respective end face) is positioned at 180 degrees of rotation (i.e., 180 degrees out of phase) about a common optical axis relative to the other fiber, as is well-known in the prior art. Further, as used herein, positions within 15 degrees of rotation from the position of rotational alignment are also considered to be rotationally aligned. In other words, fibers relatively positioned at 165 degrees or more of rotation (clockwise or counterclockwise) about a common optical axis are considered to be in "rotational alignment." As used herein, fibers relatively positioned at less than 165 degrees of rotation (e.g., at any rotational position from 0 to up to 165 degrees and from more than 195 to 360 degrees) about a common optical axis are considered to be "rotationally misaligned" or in "rotational misalignment."

Figure 2A:
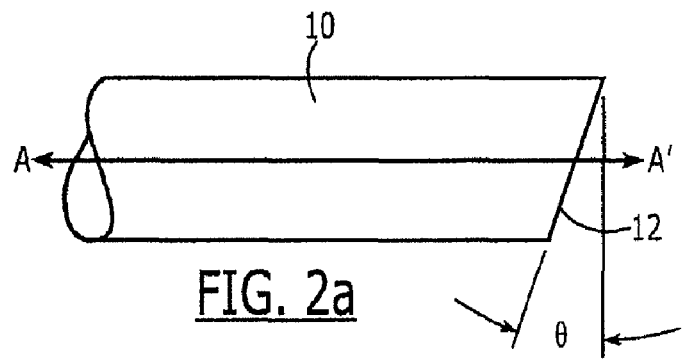
FIGS. 2a-2c are diagrammatic side views of exemplary optical fibers prepared to have angle-cleaved end faces for use in accordance with the present invention.
Figure 2B:
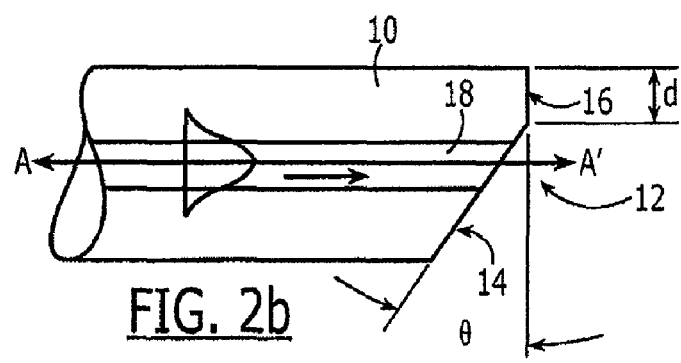
Figure 2C:
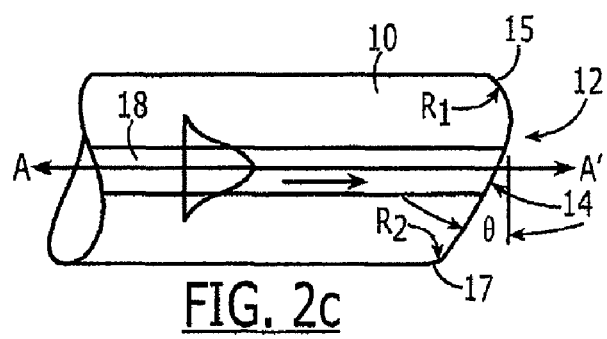

Referring now to FIGS. 2a-2c, various exemplary angled end faces are shown. For example, FIG. 2a shows an exemplary fiber 10 having a substantially flat end face 12 that is angled relative to a plane substantially normal to the optical axis AA' of the fiber 10. As is well known in the art for angled-style fibers, the angle θ preferably falls within the range of about 1 to about 30 degrees, and most preferably within a range of about 4 degrees to about 12 degrees, to avoid a level of insertion losses that exceeds desirable limits for many optical communications applications. By way of example, such a substantially flat end face 12 may be formed by mechanically cleaving the fiber using known tooling and techniques, such as a bend-to-angle cleaving technique or a twist-to-angle cleaving technique. Any suitable technique may be used. Optionally, a conventional mechanical polishing technique may be used to provide the desired substantially flat end face 12.

FIG. 2b shows an exemplary fiber 10 having a chamfered end face 12. The chamfered end face has a first portion 14 that is angled relative to a plane substantially normal to the optical axis AA' of the fiber 10. As is well known in the art for angled-style fibers, the angle θ preferably falls within the range of about 1 to about 30 degrees, and most preferably with a range of about 4 degrees to about 12 degrees, to avoid an undesirable level of insertion losses. The chamfered end face 12 further includes a second portion 16 that is substantially normal to the optical axis AA'. The chamfered end face has a face width d, as shown in FIG. 2b. Preferably, the width d is selected such that the second portion 16 does not impinge significantly upon the fiber's optical power distribution, which is concentrated within the fiber's core 18, as well known in the art. Preferably, d falls within a range of about 20 µm to 50 µm. The inclusion of first portion 16, relative to a substantially flat angled end face, is particularly advantageous in closing a gap between the core 18 of the chamfered fiber and any mating fiber. By way of example, such a chamfered end face 12 may be formed by mechanically cleaving the fiber using known tooling and techniques, and then using a conventional mechanical polishing technique to provide the first and second portions 14 and 16. Alternatively, a conventional laser cleaving technique may be used to provide the first and second portions of chamfered end face 12. Any suitable technique may be used.

FIG. 2c shows an exemplary fiber 10 having a radiused end face 12. The radiused end face 12 may have a first portion 14 that is angled relative to a plane substantially normal to the optical axis AA' of the fiber 10, at angle θ within the range of about 1 to about 30 degrees, and most preferably about 4 degrees to about 12 degrees. The radiused end face 12 further includes a second portion 15, and optionally a third portion 17, that are curved out of a plane substantially normal to the optical axis AA'. Optionally, these portions 15, 17 have consistent radii of curvature $R_1$ and $R_2$, which may be the same or different. The radius $R_1$ of first portion 15 is particularly advantages in closing a gap between the core 18 of the radiused fiber and any mating fiber. By way of example, such a radiused end face 12 may be formed by a conventional laser cleaving technique. Any suitable technique may be used.

Figure 3:
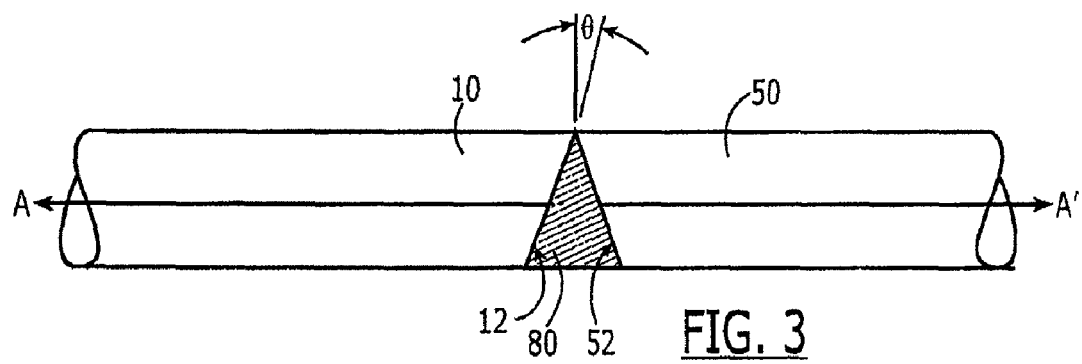
FIGS. 3, 4 and 5 are a diagrammatic side views of optical fibers having exemplary matching angle-cleaved end faces, and shown in rotational misalignment (in phase along a common optical axis) for mating in accordance with the present invention.
Figure 4:
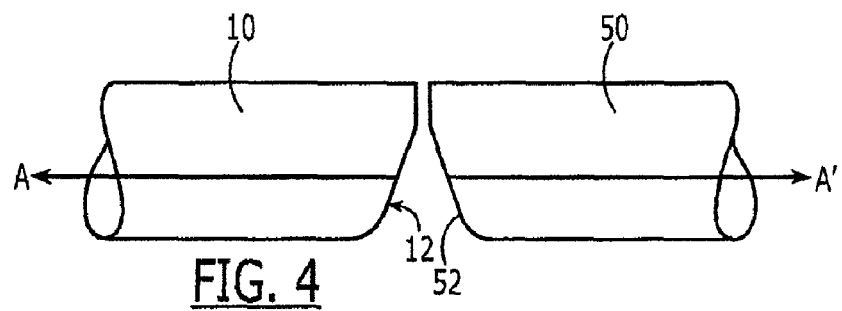
Figure 5:
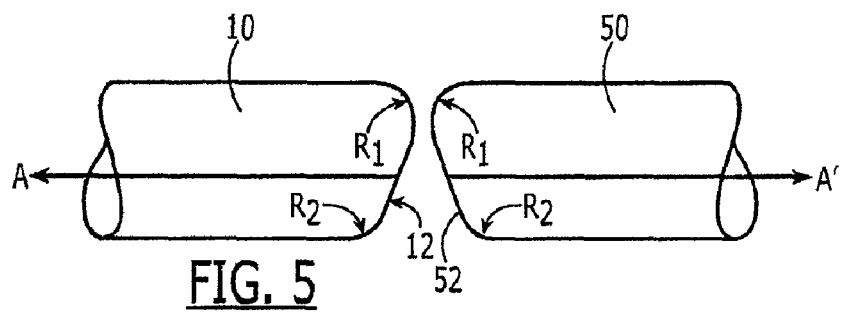

FIGS. 3, 4 and 5 are a diagrammatic side views of optical fibers 10, 50 shown in mating position in accordance with the present invention. It will be appreciated that these fibers 10, 50 and their end faces 12, 52 are similar to those shown in FIG. 1. However, in accordance with the present invention, the fibers 10, 50 in FIG. 3 are shown mated in rotational misalignment, and with index matching fluid/gel 80 positioned therebetween, i.e. in the space between the angled end faces 12, 52 of the fibers 10, 50. In the particular example of FIG. 3, one fiber 50 is shown in a position that is at 0 degrees of rotation about common optical axis AA', relative to fiber 10. In this position, fibers 10 and 50, which have similar (matched) substantially flat angled end faces 12, 52 appear to be mirror images of each other. As used herein, these fibers, positioned at 0 degrees of axial rotation relative to one another, are referred to as "in phase." For reference, FIG. 1 shows similar fibers positioned at 180 degrees of rotation, about common optical axis AA, relative to one another.

FIGS. 4 and 5 also show fibers in mating position (in rotational misalignment) in accordance with the present invention. Further, the exemplary mating fibers of FIGS. 4 and 5 have matching angle-cleaved end faces 12, 52. FIG. 4 shows mating of fibers having matching chamfered end faces 12, 52. FIG. 5 shows mating of fibers 10, 50 having matching radiused end faces 12, 52.

Figure 6:
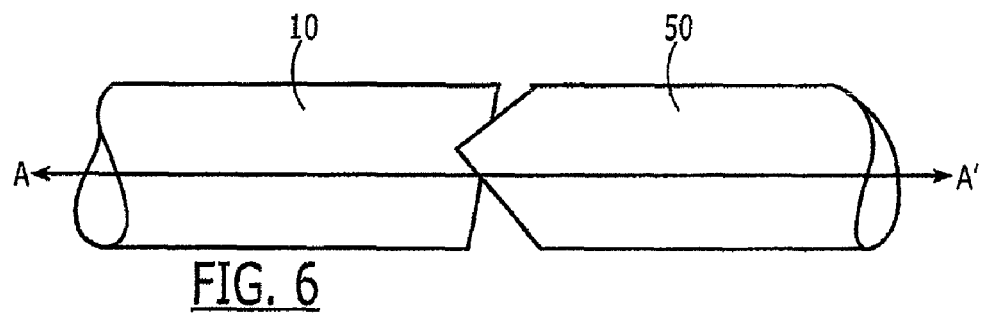
FIG. 6 is a diagrammatic side view of optical fibers of FIG. 3, shown in rotational misalignment (90 degrees out of phase along a common optical axis) for mating in accordance with the present invention.

FIG. 6 is a diagrammatic side view of optical fibers of FIG. 3, shown out of rotational alignment, i.e. in rotational misalignment, consistent with the present invention. More specifically, FIG. 6 shows for illustrative purposes exemplary fibers 10, 50 in which the fibers 10, 50 are separated by 90 degrees of rotation about common optical axis AA'. In other words, fibers 10 and 50 are shown 90 degrees out of phase along optical axis AA'.

Figure 7:
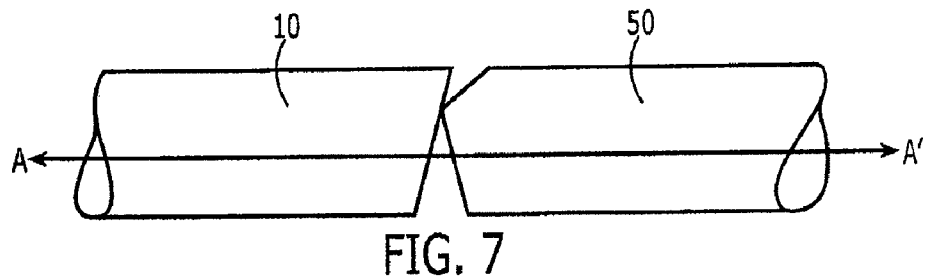
FIGS. 7 and 8 are diagrammatic side views of optical fibers having unmatched angle-cleaved end faces, and shown in rotational misalignment (in phase along a common optical axis) for mating in accordance with the present invention.
Figure 8:
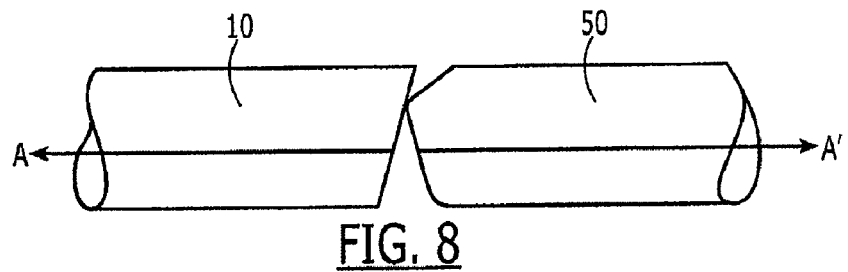
Figure 9:
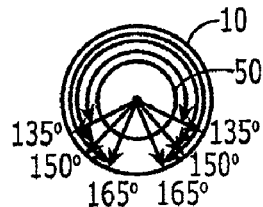
FIG. 9 is a diagrammatic end view showing relative positions of exemplary mated fibers consistent with the present invention.

FIGS. 3-6 are illustrative of embodiments of the present invention in which both the launch fiber and the receive fiber have similar (matched) end face configurations. In contrast, FIGS. 7 and 8 are illustrative of embodiments of the present invention in which the launch fiber and the receive fiber have dissimilar (mismatched) end face configurations. For example. FIG. 6 is a diagrammatic side view of optical fibers 10, 50 having mismatched angle-cleaved end faces in which fiber 10 has a substantially flat end face 12 and fiber 50 has a radiused end face 52. By way of further illustration, FIG. 7 shows a diagrammatic side view of optical fibers 10, 50 having mismatched angle-cleaved end faces in which fiber 10 has a substantially flat end face 12 and fiber 50 has a chamfered end face 52. Any combination of fiber end faces may be employed consistent with the present invention, provided that each fiber includes a mating end face that is angle cleaved. Consistent with the present invention, each pair of mating fibers 10, 50 in FIGS. 6-8 is shown in rotational misalignment in accordance with the present invention. In the examples of FIGS. 6-8, the fibers are shown in positions such that fiber 50 is rotationally positioned at 0 degrees of rotation about common optical axis AA', relative to fiber 10. However, it will be appreciated that, consistent with the present invention, the fibers may be positioned at any relative rotational positions, and thus precise alignment of the angled end faces of the mating fibers is not required. It will be further appreciated that mated fibers that have angled end faces that are rotationally positioned about a common optical axis less than 150 degrees out of phase (clockwise or counterclockwise) are preferred, and less than 135 out of phase are most preferred. This relationship is best shown in FIG. 9.

Figure 10:
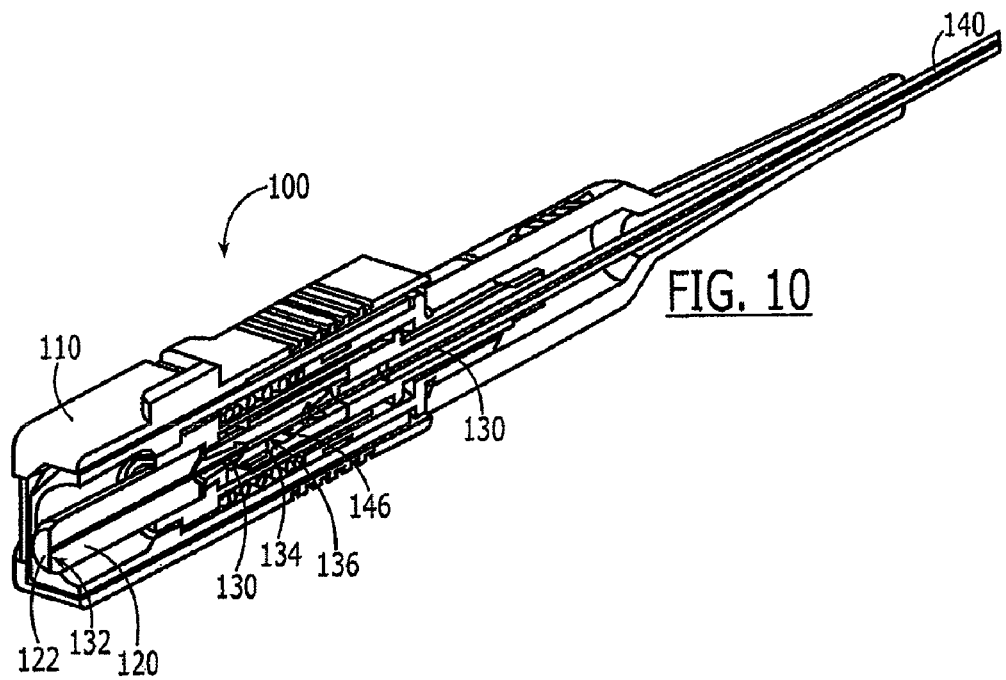
FIG. 10 is a cross-sectional perspective view of an exemplary fiber optic connector including mating fibers spliced within a connector in accordance with the present invention.

The mating of fibers in accordance with the present invention may be used to optically couple fibers in a splice within a connector. For example, FIG. 10 shows an exemplary fiber optic connector including a splice within a connector. In this example, the connector is an SC style connector. Referring now to FIG. 10, it is noted that the connector 100 includes a housing 110, a ferrule 120 supported on the housing 110. The ferrule has a distal end 122. As is typical of field-installable connectors, the exemplary connector 100 includes a fiber stub 130 secured in the ferrule 120. The fiber stub 130 has a first end 132 adjacent the ferrule's distal end 122, and a second end 134 positioned proximally of the distal end 122. Consistent with the present invention, the second end of the fiber stub 130 has an angled end face 136 (analogous to end faces 12 and 52 of FIGS. 2a-8). The connector further includes a mating optical fiber 140 secured to the housing 110. Consistent with the present invention, the mating optical fiber 140 has a respective angled end face 146 positioned in close and rotationally misaligned relationship with the angled end face 136 of the fiber stub 130, to form a splice. Index matching fluid is positioned between the angled end faces 136, 146 in accordance with the present invention.

In the example of FIG. 10, the fiber stub 130 and the mating optical fiber 140 have matched angled end faces (specifically, substantially flat angled end faces 136, 146). However, it will be appreciated that in alternative embodiments, the fiber stub 130 and the mating optical fiber 140 have mismatched angled end faces. Further, the angled end faces are rotationally positioned less than 165 degrees out of phase about a common optical axis, and preferably less than 150 degrees out of phase.

In an alternative embodiment, the ferrule is a multi-fiber ferrule. In such an embodiment, the connector includes a corresponding plurality of fiber stubs secured in the ferrule, and a plurality of mating optical fibers secured to the housing. Similarly, each mating optical fiber has a respective angled end face positioned in close and rotationally misaligned relationship with a respective angled end face of a respective fiber stub to form a splice, with index matching fluid positioned therebetween.

Figure 11:
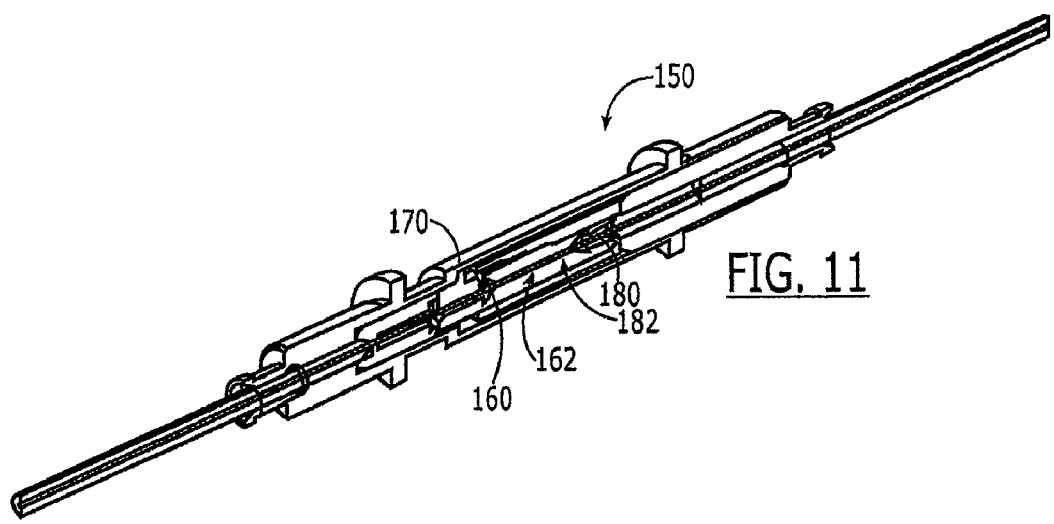
FIG. 11 is a view of an exemplary fiber optic subassembly including mating fibers spliced within a connector in accordance with the present invention.

Another aspect of the present invention provides a fiber optic subassembly. An exemplary subassembly 150 is shown in FIG. 11. In such a subassembly, the technology described above is used to mate/splice fibers to form a semi-permanent splice within a housing, as is often performed in the field. Accordingly, the subassembly 150 includes first and second optical fibers 160, 180. The fibers are supported on a housing 170. Each fiber has an angled end face 162, 182 for forming an optical connection. Further, the subassembly includes index matching fluid between the end faces 162, 182. Consistent with the present invention, the angled end faces 162, 182 of the fibers are positioned in close and rotationally misaligned relationship, with index matching fluid positioned therebetween to form an optical connection between the first and second fibers 160, 180. It will be appreciated that each fiber may have any suitable angled end face, and that that angled end faces of mating connectors may be matched or mismatched. Further, the angled end faces of mating fibers may be rotationally positioned in any rotationally misaligned manner. For example, the angled end faces of the first and second fibers may be rotationally positioned less than 165 degrees out of phase about a common optical axis. Alternatively, the angled end faces of the first and second fibers are rotationally positioned less than 150 degrees out of phase about a common optical axis.

Fiber optic splices consistent with the present invention may be made by a method including angle cleaving first and second optical fibers to provide a launch and receive fibers having angled end faces. Any suitable technique may be used to create the angled end face, including mechanical cleaving, mechanical polishing and laser cleaving, as discussed above. Further, the angled end faces may be matched or mismatched, and each angled end face may have any suitable angled configuration, such as substantially flat, chamfered, or radiused, as discussed above.

The method further includes applying index matching fluid adjacent at least one of the angled end faces. Any suitable index matching fluid may be used. The method further includes positioning the angled end faces in close and rotationally misaligned relationship with index matching fluid therebetween. As used herein, "close" relationship means with that the distal ends of the fibers are positioned within 25 µm of each other, and that preferably the angled end faces/fibers/ferrules are in physical contact. The method further includes securing at least one of the first and second optical fibers to maintain rotational misalignment between the angled end faces. For example, this may include applying and curing a suitable epoxy, or crimping a suitable connector.

By way example, positioning the angled end faces in close and rotationally misaligned relationship may involve positioning the angled end faces such that they are rotationally positioned about a common optical axis less than 165 degrees, or less than 150 degrees, or less than 135 degrees, out of phase.

Figure 12A:
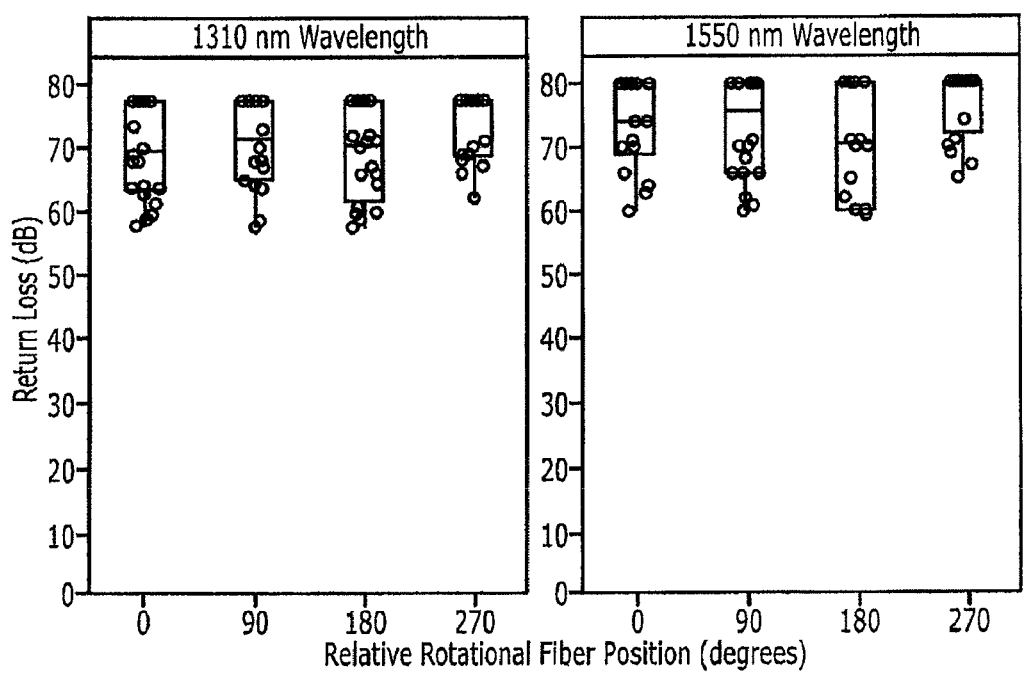
FIGS. 12a and 12b are graphical representations of data showing a relationship between return loss and relative fiber positions for an exemplary test.
Figure 12B:
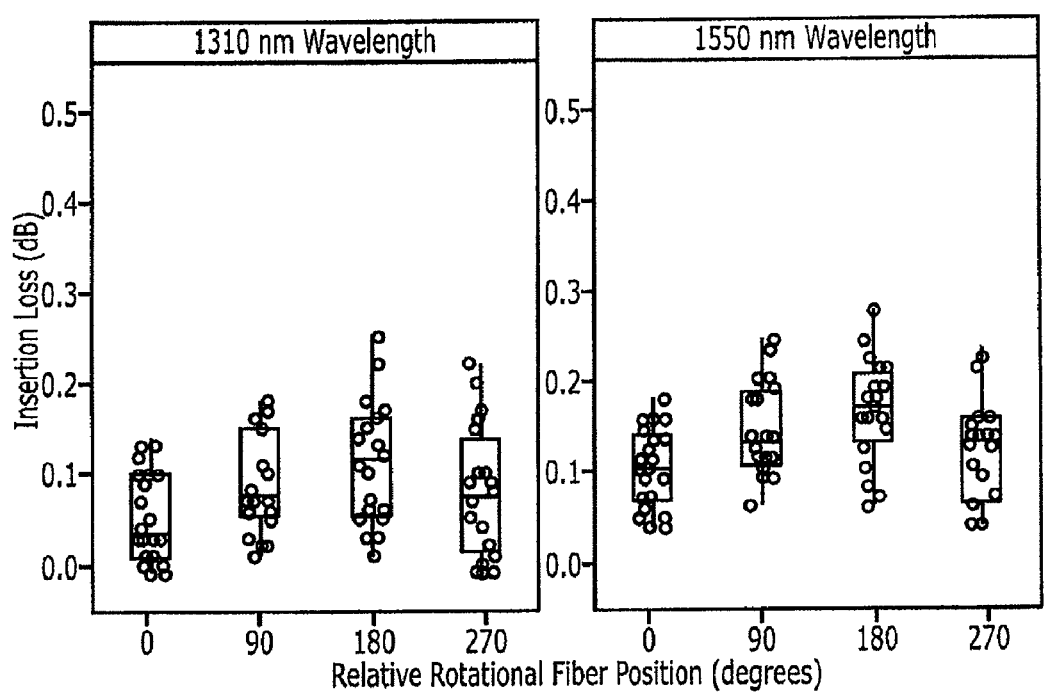

A test was conducted in which LightCrimp Splice connectors, manufactured and/or distributed by Tyco Electronics Corporation of Berwyn, Pa., were prepared to include optical fibers having 8 degree chamfered angled end faces prepared by mechanically polishing. Insertion loss measurements were taken using 1310 nm and 1550 nm wavelength lasers at relative rotational fiber positions of 0 degrees, 90 degrees, 180 degrees and 270 degrees. As illustrated in FIG. 12a, there was statistically no observed difference in connector return loss when comparing the 180 degree (complementarily aligned, or rotationally aligned, orientation), and the rotationally misaligned positions. Furthermore, this same trend was observed upon comparison of the insertion losses as shown in FIG. 12b.

Table 1 shows data for a test in which the RecordSplice device manufactured and/or distributed by Tyco Electronics Corporation of Berwyn, Pa., was used to prepare connections by mechanically cleaving fibers to have 8 degree angled end faces. Further, insertion loss and return loss measurements were taken using 1310, 1550 and 1625 nm wavelength lasers at a plurality of rotationally misaligned positions of the mating fibers. Surprisingly, as will be appreciated from the Table 1, in no case was return loss measured to be less than 60 dB, which is considered a relevant threshold in many analog telecommunication applications. Also surprising, insertion loss varied relatively little with respect to all the relative angular orientations.

TABLE 1

| Relative Rotational Angle | Insertion Loss (dB) | | | Return Loss (dB) | | |
|---|---|---|---|---|---|---|
| (degrees) | 1310 | 1550 | 1625 | 1310 | 1550 | 1625 |
| 0 | 0.07 | 0.10 | 0.12 | 73.7 | 75.6 | 80 |
| 150 | 0.07 | 0.07 | 0.11 | 73.7 | 68.6 | 69.8 |
| 0 | 0.06 | 0.06 | 0.09 | 71.2 | 71.3 | 74.4 |
| 150 | 0.10 | 0.10 | 0.11 | 80 | 76.2 | 80 |
| 0 | 0.09 | 0.12 | 0.17 | 76.1 | 76.6 | 80 |
| 120 | 0.04 | 0.07 | 0.10 | 76.1 | 76.6 | 77.3 |
| 0 | 0.09 | 0.10 | 0.13 | 80 | 80 | 77.2 |
| 120 | 0.08 | 0.11 | 0.14 | 71.5 | 70.1 | 73.6 |
| 0 | 0.06 | 0.05 | 0.08 | 73.9 | 75.5 | 76.2 |
| 90 | 0.13 | 0.13 | 0.15 | 74 | 76 | 73.6 |
| 0 | 0.05 | 0.07 | 0.10 | 74.5 | 74.1 | 76.1 |
| 90 | 0.12 | 0.14 | 0.14 | 74.5 | 74.3 | 77.1 |
| 0 | 0.09 | 0.13 | 0.13 | 80 | 74.6 | 80 |
| 210 | 0.10 | 0.13 | 0.16 | 80 | 74.8 | 76.8 |
| 0 | 0.09 | 0.09 | 0.11 | 74.6 | 76.5 | 77.4 |
| 210 | 0.12 | 0.11 | 0.13 | 80 | 74.1 | 77.1 |
| 0 | 0.06 | 0.08 | 0.10 | 74.1 | 74.7 | 76.9 |
| 240 | 0.06 | 0.10 | 0.11 | 74.1 | 74.1 | 76.4 |
| 0 | 0.08 | 0.09 | 0.13 | 80 | 76.6 | 77.4 |
| 240 | 0.09 | 0.10 | 0.10 | 72 | 71 | 76.7 |
| 0 | 0.08 | 0.07 | 0.10 | 80 | 75.8 | 76.6 |
| 270 | 0.07 | 0.08 | 0.13 | 69.8 | 66.4 | 63.6 |
| 0 | 0.12 | 0.14 | 0.15 | 74.9 | 76.7 | 80 |
| 270 | 0.10 | 0.09 | 0.14 | 74.9 | 73.9 | 74.2 |

Accordingly, Applicants discovered unexpectedly that optical fibers can be mated, in connectors and at splices, to provide satisfactory optical connections for most applications, without the need for matched cleaves, and without the need for precise rotational alignment of the cleaves, provided that angled end faces are provided on both the launch and receive fibers and that index matching gel is provided between the angled end faces. Thus, fibers may be satisfactorily mated relatively easily and inexpensively, particularly in the field, without the need for specialized tools or particular care to align the launch and receive fibers.

While the present invention has been particularly shown and described with reference to the preferred mode as illustrated in the drawing, it will be understood by one skilled in the art that various changes in detail may be effected therein without departing from the spirit and scope of the invention as defined by the claims.

What is claimed is:

1. A method for mating optical fibers, the method comprising:
   providing first and second optical fibers, each optical fiber having a respective angled end face;
   positioning the angled end faces adjacent one another without ensuring rotational alignment of the angled end faces;
   providing index matching fluid between the angled end faces; and
   securing at least one of the first and second optical fibers to ensure optical coupling between the first and second optical fibers.

2. The method of claim 1, wherein the positioning results in a random relative rotational orientation of the angled end faces, the securing fixing the random relative rotational orientation of the angled end faces.

3. The method of claim 1, wherein the positioning results in a rotationally misaligned relationship between the angled end faces, the securing fixing the rotationally misaligned relationship of the angled end faces.

4. The method of claim 3, wherein the positioning comprises positioning the angled end faces with the angled end faces aligned along a common optical axis in rotational positions that are less than 165 degrees out of phase.

5. The method of claim 3, wherein the positioning comprises positioning the angled end faces with the angled end faces aligned along a common optical axis in rotational positions that are less than 150 degrees out of phase.

6. The method of claim 1, wherein the providing comprises providing first and second optical fibers having matched angled end faces that have similar end face configurations.

7. The method of claim 1, wherein the providing comprises providing first and second optical fibers having matched angled end faces that have dissimilar end face configurations.

8. A method for mating optical fibers, the method comprising:
   providing first and second optical fibers having first and second angled end faces, respectively;
   positioning the second angled end face adjacent the first angled end face in a mating position that is not in rotational alignment with the first angled end face, with index matching fluid between the first and second angled end faces; and
   securing at least one of the first and second optical fibers to ensure optical coupling therebetween.

9. A multi-fiber optical connector comprising:
   a housing;
   a multi-fiber ferrule having a distal end, the ferrule being supported on the housing;
   a plurality of fiber stubs secured in the ferrule, each of the plurality of fiber stubs having a respective first end adjacent the ferrule's distal end and a respective second end positioned proximally of the distal end, each second end having an angled end face;
   a plurality of mating optical fibers secured to the housing, each mating optical fiber having a respective angled end face positioned in close and rotationally misaligned relationship with a respective angled end face of a respective one of the plurality of fiber stubs to form a respective splice; and
   index matching fluid positioned between the angled end faces of the plurality of fiber stubs and the plurality of mating optical fibers.

10. The fiber optic connector of claim 9, wherein the respective fiber stub and mating optical fiber of each splice have matched angled end faces that have similar angular end face configurations.

11. The fiber optic connector of claim 10, wherein the relative rotational orientations of the fiber stubs and the mating optical fibers vary among the splices.

12. The fiber optic connector of claim 10, wherein the respective fiber stub and mating optical fiber of each splice are positioned in a random relative rotational orientation.

13. The fiber optic connector of claim 12, wherein the relative rotational orientations of the fiber stubs and the mating optical fibers vary among the splices.

14. The fiber optic connector of claim 9, wherein the respective fiber stub and mating optical fiber of each splice have mismatched angled end faces that have dissimilar angular end face configurations.

15. The fiber optic connector of claim 14, wherein the relative rotational orientations of the fiber stubs and the mating optical fibers vary among the splices.

16. The fiber optic connector of claim 14, wherein the respective fiber stub and mating optical fiber of each splice are positioned in a random relative orientation.

17. The fiber optic connector of claim 16, wherein the relative rotational orientations of the fiber stubs and the mating optical fibers vary among the splices.

18. A fiber optic subassembly comprising:
   a housing;
   first and second optical fibers supported on the housing, each optical fiber having an angled end face, the angled end faces being supported adjacent one another in close relationship and out of rotational alignment; and
   index matching fluid disposed between the angled end faces to form an optical connection between the first and second optical fibers.

19. The fiber optic subassembly of claim 18, wherein the angled end faces are matched in that they have similar angular end face configurations.

20. The fiber optic subassembly of claim 18, wherein the angled end faces are mismatched in that they have dissimilar angular end face configurations.

* * * * *